(12) United States Patent
Vauchel et al.

(10) Patent No.: US 8,070,101 B2
(45) Date of Patent: Dec. 6, 2011

(54) LOCKING SYSTEM FOR A MOVABLE NACELLE COWL

(75) Inventors: Guy Bernard Vauchel, Le Havre (FR); Georges Alain Bouret, Epouville (FR)

(73) Assignee: Aircelle (FR)

( * ) Notice: Subject to any disclaimer, the term of this patent is extended or adjusted under 35 U.S.C. 154(b) by 161 days.

(21) Appl. No.: 12/439,017

(22) PCT Filed: Jul. 2, 2007

(86) PCT No.: PCT/FR2007/001113
§ 371 (c)(1),
(2), (4) Date: Nov. 3, 2009

(87) PCT Pub. No.: WO2008/025890
PCT Pub. Date: Mar. 6, 2008

(65) Prior Publication Data
US 2010/0059634 A1    Mar. 11, 2010

(30) Foreign Application Priority Data
Aug. 31, 2006 (FR) ...................................... 06 07647

(51) Int. Cl.
*B64C 1/14* (2006.01)
(52) U.S. Cl. ................. 244/129.4; 244/110 B
(58) Field of Classification Search .............. 244/110 B, 244/129.4, 129.5; 292/176, 145, 155, 256.71, 292/256.76, 307 R, 316, 320, 327; 70/278.7, 70/279.1, 280–282
See application file for complete search history.

(56) References Cited

U.S. PATENT DOCUMENTS

| | | | | |
|---|---|---|---|---|
| 3,638,983 A | * | 2/1972 | Flournoy et al. | 292/302 |
| 4,679,750 A | * | 7/1987 | Burhans | 244/129.4 |
| 4,778,036 A | * | 10/1988 | Nowak | 188/85 |
| 4,800,741 A | * | 1/1989 | Kerschenbaum et al. | 70/13 |
| 5,100,186 A | | 3/1992 | Nordvall | |
| 5,203,525 A | | 4/1993 | Remlaoui | |
| 5,864,922 A | * | 2/1999 | Kraft | 16/266 |

(Continued)

FOREIGN PATENT DOCUMENTS

CA    2 103 995    2/1995

(Continued)

OTHER PUBLICATIONS

International Search Report PCT/FR2007/001113; Dec. 19, 2007.

*Primary Examiner* — Timothy D Collins
*Assistant Examiner* — Jamie S Stehle
(74) *Attorney, Agent, or Firm* — Cantor Colburn LLP

(57) ABSTRACT

The present invention relates to a locking system (20) for a movable lateral cowl (8) of a turbine engine nacelle intended to be connected to a pylon (4) of an aircraft, comprising, on the one hand, a clevis (21) intended to be connected to the pylon, and, on the other hand, a rod (22) intended to be mounted on the movable cowl and capable of engaging with the clevis when the movable cowl is in the closed position, characterized in that the rod is mounted so that it can move translationally along a substantially longitudinal axis of the movable cowl so as to form a slider which can shift between a locked position, in which it is engaged with the clevis and provides a structural connection between the pylon and the movable cowl, and an unlocked position, in which it is disengaged from the clevis and allows the movable cowl to be opened.

13 Claims, 5 Drawing Sheets

U.S. PATENT DOCUMENTS

| | | |
|---|---|---|
| 6,220,546 B1 | 4/2001 | Klamka et al. |
| 6,340,135 B1 | 1/2002 | Barton |
| 6,517,027 B1 | 2/2003 | Abruzzese |
| 6,669,144 B2 * | 12/2003 | Artsiely ..................... 244/129.5 |
| 6,848,729 B2 * | 2/2005 | Caspi et al. .............. 292/341.16 |

FOREIGN PATENT DOCUMENTS

| | | |
|---|---|---|
| EP | 0 823 373 | 2/1998 |
| GB | 2 408 066 | 5/2005 |

* cited by examiner

LOCKING SYSTEM FOR A MOVABLE NACELLE COWL

FIELD OF THE INVENTION

The present invention relates to a locking system for a lateral movable cowl of a nacelle of a turbojet engine intended to be connected to a pylon of an aircraft, said locking system comprising, on the one hand, a clevis intended to be connected to the pylon, and on the other hand, a rod intended to be mounted on the movable cowl and capable of engaging with the clevis when the movable cowl is in the closed position.

BACKGROUND OF THE INVENTION

An airplane is propelled by several turbojet engines, each housed in a nacelle, which also accommodates a group of related actuating devices connected with its operation, such as a thrust reverser device, and provides various functions when the turbojet engine is operating or is at a standstill.

A nacelle generally has a tubular structure comprising an air inlet upstream of the turbojet engine, a central section intended to surround a turbojet fan, a section downstream accommodating the thrust reverser means and intended to surround the combustion chamber of the turbojet engine, and is generally finished by an ejection nozzle, the outlet of which is situated downstream of the turbojet engine.

Modern nacelles are intended to accommodate a two-flow turbojet engine, which is capable, through the intermediary of the rotating fan blades, of generating a hot air flow (also called the primary flow) derived from the turbojet engine combustion chamber, and a cold air flow (secondary flow) which circulates outside the turbojet engine through an annular passage, also called a vein, formed between a turbojet engine fairing (or an internal structure of the structure downstream of the nacelle and surrounding the turbojet engine) and an internal wall of the nacelle. The two air flows are ejected from the turbojet engine at the rear of the nacelle.

Each propulsive assembly of the airplane is therefore formed by a nacelle and a turbojet engine, and is suspended from a fixed airplane structure, for example under a wing or on the fuselage, by means of a pylon connected to the turbojet engine or to the nacelle.

The nacelle is generally provided with movable cowls which can be opened to allow access to the turbojet engine during maintenance operations. The said movable cowls are generally situated at the middle section surrounding the fan or at the turbojet engine gas generator, although these latter can be replaced by thrust reverser cowls.

Normally speaking, the curvature of said cowls is adapted to the environment of the turbojet engine, allowing it to be integrated in the nacelle and providing aerodynamic continuity in the closed position. The cowls are generally connected to the pylon supporting the nacelle by attachment means that allow them to pivot about an axis that is substantially parallel to a longitudinal axis of the nacelle and have a lower edge that is provided with locking means allowing them to be maintained in the closed position during flight operations.

Once the locking means have been released, the cowls are opened by making them pivot about the attachment means that are integral with the pylon.

For reasons connected with accessibility to the turbojet engine or to the strut, for example, it would be possible for the cowls to be connected or pivoted in a different manner in an area other than an area situated under the airplane strut, notably about an axis substantially perpendicular to the longitudinal axis of the nacelle. Such a change in position generally gives rise to a problem of connecting the said cowls to the structure of the aircraft or to the nacelle itself. Indeed, the current configuration for mounting the nacelle structure uses the cowl pivot points as structural connection points, sometimes in association with a connection between a cowl blade-like member and a peripheral throat-like passage in the fan housing.

Such a method of opening movable cowls formed by the half-parts of a thrust reverser structure is described in patent application FR 06.01350, not yet published.

Attaching the cowls in a pivotable manner in another location in the nacelle no longer allows the afore-described pivoting attachment means to be used as a structural connection for the cowls, and more generally for the nacelle structure, on the pylon.

SUMMARY OF THE INVENTION

The present invention alleviates the disadvantages referred to above, and, to do this, provides a locking system for a lateral movable cowl of a nacelle of a turbojet engine intended to be connected to an aircraft pylon, said locking system comprising, on the one hand, a clevis intended to be connected to the pylon, and on the other hand, a rod intended to be mounted on the movable cowl and capable of engaging with the clevis when the movable cowl is in the closed position, characterized in that the rod is mounted so that it can move translationally along a substantially longitudinal axis of the movable cowl so as to form a slider capable of being displaced between a locked position, in which it is engaged with the clevis and provides a structural connection between the pylon and the movable cowl, and an unlocked position, in which it is disengaged from the clevis and allows the movable cowl to be opened.

Thus, by providing a detachable locking system intended to ensure a connection between the pylon and the movable cowl, the said system allows the missing structural connection to be provided whilst enabling its disengagement when such is necessary so that it is possible to open the movable cowl.

Advantageously, the clevis has a truncated inlet. Such an inlet allows the clevis to be automatically centered with the rod when said rod is moved into the locked position.

In a preferred manner, the locking system is provided with means for entraining the rod and, in an advantageous manner, includes mechanical means for remote control of the rod.

Advantageously, the entrainment means include at least one electric motorized element and the locking system therefore, advantageously, includes electric means for remote control of the rod.

Once again advantageously, the locking system includes at least one position sensor for the rod capable of being connected to at least one associated signaling means.

In a preferred manner, the locking system includes an eyelet that is integral with the movable cowl and is capable of receiving an end of the rod when said rod is in the locked position and has traversed the clevis.

Advantageously, the clevis is associated with a centering pin that is capable of cooperating with a corresponding bore in the movable cowl, preferably having a truncated inlet. The truncated inlet allows the centering pin to be automatically centered.

The present invention also relates to a nacelle for a turbojet engine, said nacelle comprising a front air inlet section, a central section intended to surround a turbojet engine fan and a rear section, the nacelle also comprising at least one lateral movable cowl that is capable of being displaced from a closed position, in which it provides the external aerodynamic continuity of the nacelle, to an open position, in which it allows the interior of the nacelle to be accessed, characterized in that the said movable cowl is provided with a locking system according to the invention.

In a preferred manner, the movable cowl forms part of a thrust reverser structure.

The present invention also relates to a propulsive assembly, characterized in that said propulsive assembly includes a nacelle according to the invention, accommodating a turbojet engine connected to a pylon provided with complementary elements of the locking system of the movable cowl according to the invention.

According to a first variant embodiment, the propulsive assembly includes at least one clevis secured in the pylon.

According to a second variant embodiment, the propulsive assembly includes at least one clevis connected to the pylon through the intermediary of a floating connection capable of allowing an operating clearance displacement in at least one direction.

Advantageously, the maximum admissible operating clearance in a transversal direction relative to the direction of displacement of the floating connection is less than the diameter of the inlet of the clevis.

In a preferred manner, the locking systems situated close to the fan include a clevis mounted on a floating connection.

BRIEF DESCRIPTION OF THE FIGURES

The implementation of the invention will be better understood by way of the detailed description given below with regard to the attached drawing, in which.

DETAILED DESCRIPTION OF THE PREFERRED EMBODIMENTS

Figure 1:
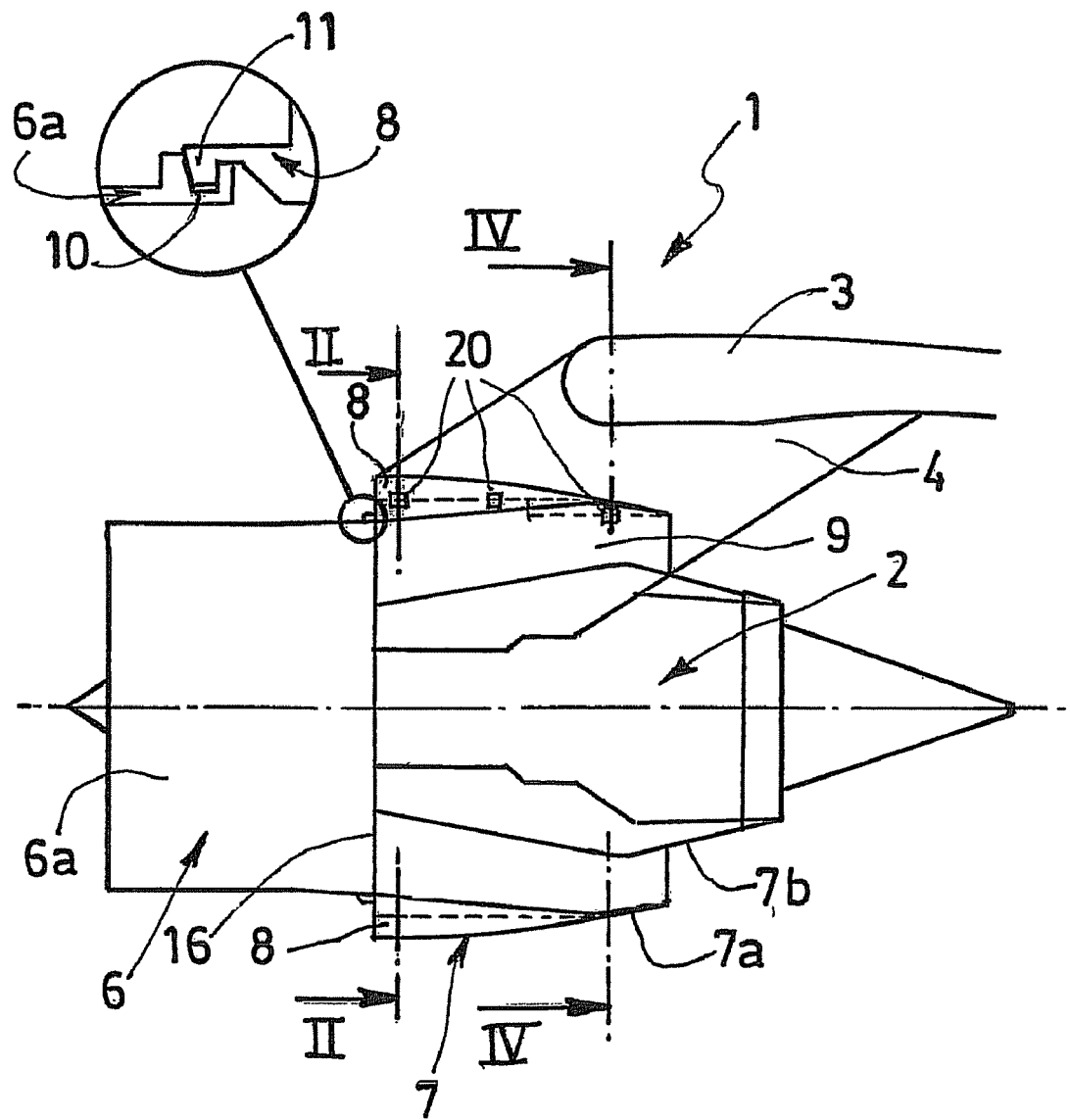
FIG. 1 is a partial schematic representation of a nacelle according to the invention, with lateral movable cowls at the rear forming part of a reverser structure.

FIG. 1 generally represents a partial view of a nacelle 1 according to the invention for a two-flow turbojet engine 2.

The nacelle 1 comprises a tubular housing for a two-flow turbojet engine 2 and is used to channel the air flows that it generates by means of the blades of a fan (not visible), namely a hot air flow traversing a pylon 4—of the turbojet engine 2, and a cold air flow circulating outside the turbojet engine 2.

Each propulsive assembly of the airplane, therefore, is formed by a nacelle 1 and a turbojet engine 2, and is suspended from a fixed airplane structure, for example under a wing 3 or on the fuselage, through the intermediary of a pylon 4 connected to the turbojet engine 2.

The structure of the nacelle 1 includes a front section (not shown) forming an air inlet, a central section 6 surrounding the fan (not visible) of the turbojet engine 2, and a rear section 7 surrounding the turbojet engine 2 and including a thrust reverser system.

The central section 6 includes, on the one hand, an internal housing 6a surrounding the fan of the turbojet engine 2, and on the other hand, an external structure (not shown) of the housing fairing as an extension of an external surface of the air inlet section. The housing 6a is connected to the air inlet section that it supports and extends an internal surface of said air inlet section.

The rear section 7 extends the central section 6 and includes an external structure 7a, which includes the thrust reverser system forming an ejection nozzle, and an internal fairing structure 7b of the turbojet engine 2, which, with the external structure 7a, defines a vein 9 intended for the circulation of the cold flow.

More precisely, the rear section 7 is realized in the form of two lateral half-parts 8 situated on both sides of the nacelle 1 forming the movable cowls.

The assembly of the external structure 7a of the rear section 7 and the internal structure 7b of each half-part is supported by a front frame 16, itself supported by the housing 6a with which it is mounted in a pivotable manner by means of pivotal joints (not visible) disposed along an axis that is substantially perpendicular to a longitudinal axis of the nacelle.

The actuating of each half-part 8 can be effected in a classic manner by means of cylinders, with a first fixed end anchored on the housing and a second end connected to the front framework by a ball-and-socket connection.

The mechanical connection between the half-parts 8 and the rest of the nacelle 1 is completed by a system comprising a throat-like passage 10 and a blade-like member 11 on a part that extends from the exterior periphery of the fan housing 6b, an enlarged detail of which can be seen in FIG. 1, the throat-like passage generally being situated at an edge of the housing 6b and the blade-like member forming part of the rear structure 7b.

As explained above, the position of the pivotal joints no longer allows them to be used as a structural link between the rear structure 7 and the pylon 4.

To do this, each half-part includes a top edge 13 and a bottom edge 14, each of which being provided with locking systems 20 according to the invention capable of allowing a connection between the pylon 4 and the corresponding half-part 8, and being provided with locks (not visible) allowing the bottom edges 14 of the two half-parts to be interconnected.

The top edge 13 of each half-part 8 is provided with three locking systems 20 according to the invention in several variant embodiments represented in FIGS. 4 to 9. The said locking systems 20 can be aligned or, as shown in FIG. 1, slightly offset both longitudinally and transversally with respect to the nacelle 1.

It is obviously possible to install more or less than three locking systems according to the invention.

Each locking system 20 includes a clevis 21 that is connected to the pylon 4 and a rod 22 that is mounted on the movable cowl 8 and is capable of engaging with the clevis 21 when the said movable cowl 8 is in the closed position. To do this, the rod 22 is mounted so that it can move translationally along an axis that is substantially parallel to the top edge 13 of the movable cowl 8 between a locked position, in which it engages with the clevis 21 and provides a structural connection between the pylon 4 and the movable cowl 8, and an unlocked position, in which it disengages from the clevis 21 and allows the movable cowl 8 to be opened.

It is expedient to note that as the rear structure 7 includes a thrust reverser system, it is closely associated with the structure of the turbojet engine 2. In fact, the said turbojet engine, by its design and use, is subjected to relative displacements with regard to the structure of the aircraft, and therefore to the pylon 4, due principally to a phenomenon of thermal expansion of the parts. The system of a throat-like passage 10 and a blade-like member 11 is particularly sensitive to these effects.

To remedy this disadvantage, the clevis 21 of the locking systems 20 situated close to the fan is connected to the pylon 4 through the intermediary of a floating connection by means of a connecting rod 23 that traverses the pylon 4 so as to connect the corresponding locking systems 20 of each half-part 8, it being possible to displace said connecting rod 23 slightly in a transversal direction of the nacelle 1.

Figure 9:
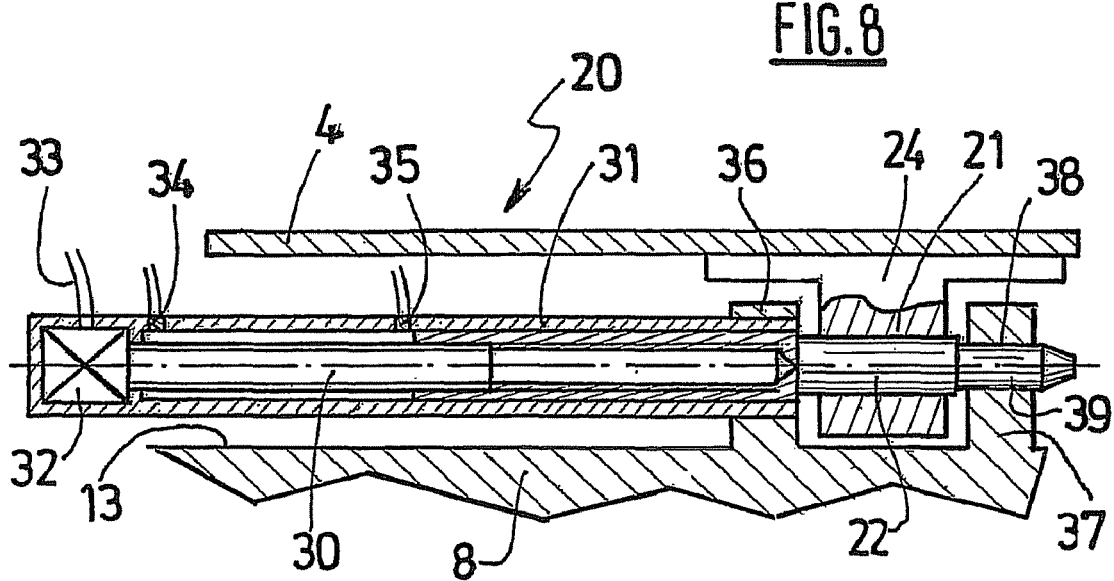
FIG. 9 is a representation of a variant of the embodiment of the locking system in FIGS. 6 and 7 including a clevis mounted secured in the pylon.

Such a floating system can be installed for all the locking systems 20 or just for those situated closest to the fan, it being possible to use a fixed connection system, as represented in FIG. 9, for locking systems 20 that are located sufficiently far away and are subjected less to the effects of thermal expansion.

Figure 2:
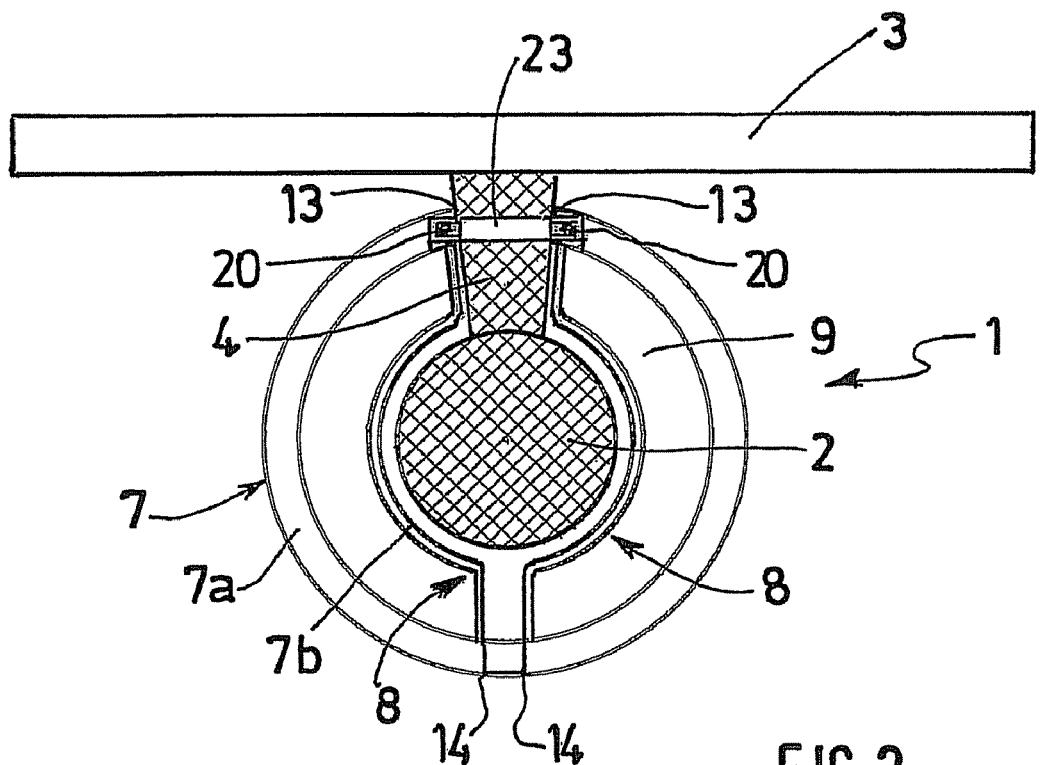
FIG. 2 is a cross section of a schematic representation of the nacelle in FIG. 1 along the line II-II.

FIG. 2 generally shows the layout of such a floating connection. It is expedient to note that the connecting rod 23 may possibly be mounted free in more than one direction and may have certain degrees of freedom blocked.

Figure 3:
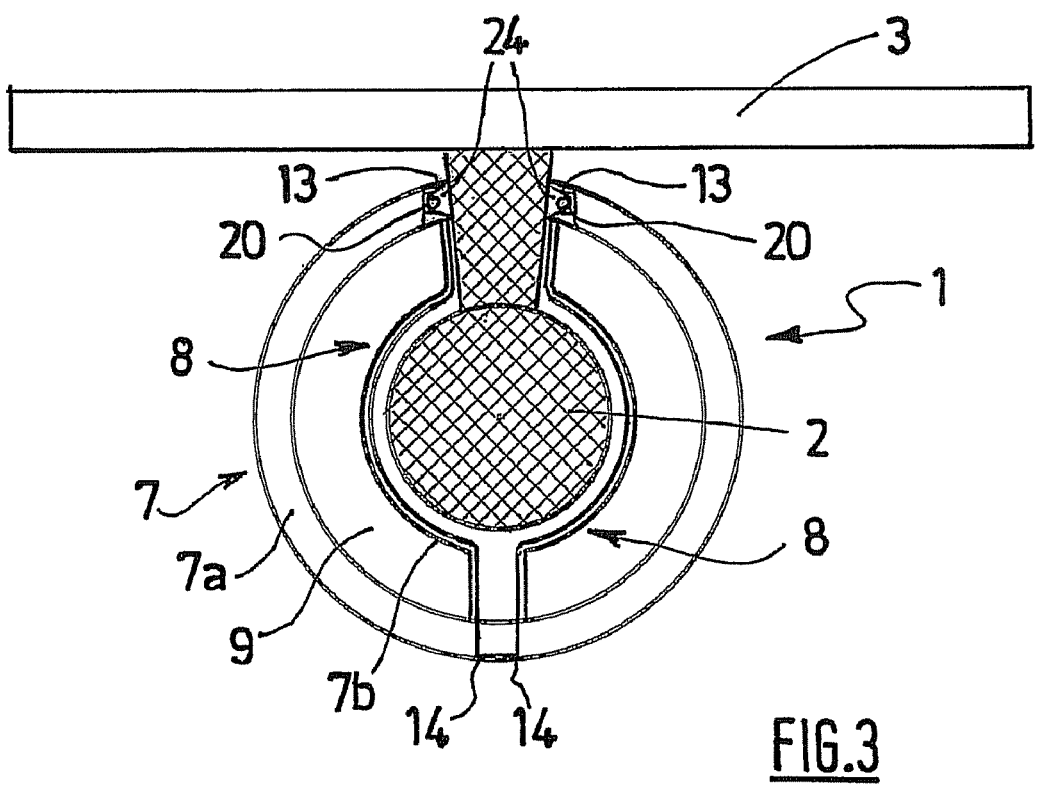
FIG. 3 is a cross section of a schematic representation of the nacelle in FIG. 1 along the line III-III.

FIG. 3 generally shows the layout of a fixed connection in the pylon 4 by means of a metal fitting 24.

Figure 4:
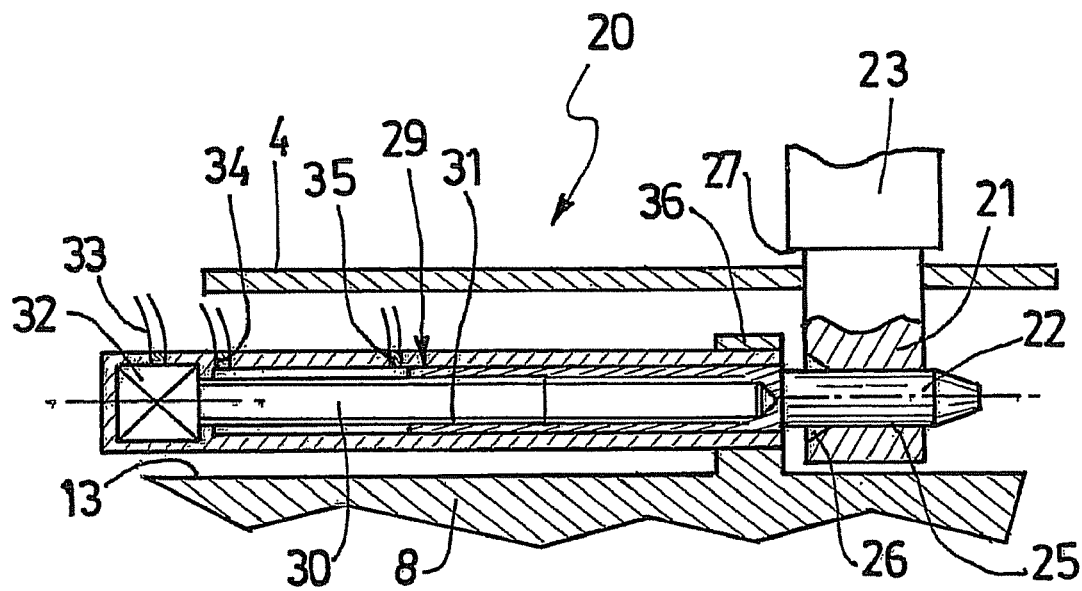
FIG. 4 is a cross section of a schematic representation of a first embodiment of a locking system according to the invention, in its locked position.
Figure 5:
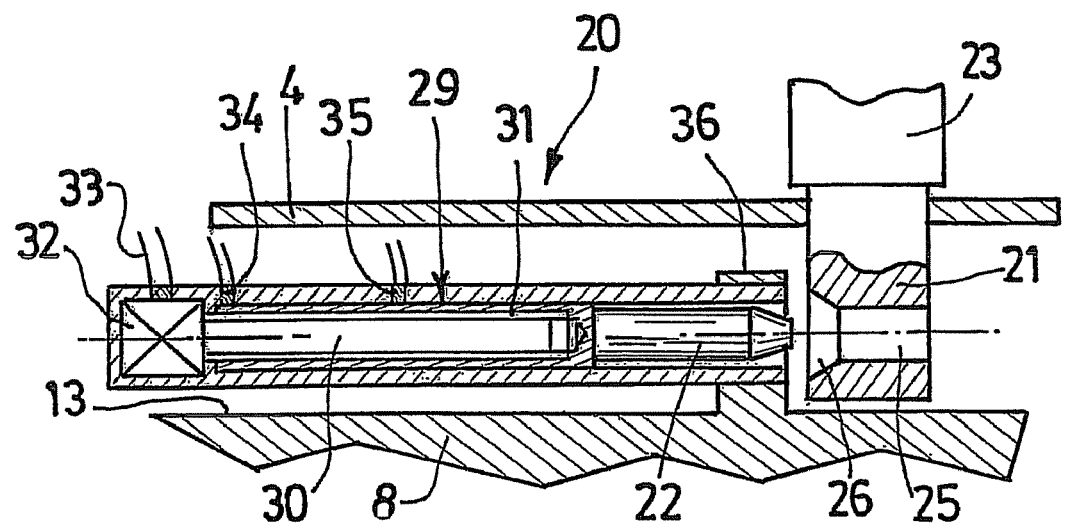
FIG. 5 is a representation of the locking system in FIG. 4 in its unlocked position.

A first variant embodiment of a locking system 20 according to the invention is generally represented in FIGS. 4 and 5, showing respectively the position of engagement of the rod 22 with the clevis 21 and the unlocked position allowing the movable cowl 8 to be opened.

The clevis 21, mounted on the connecting rod 23 traversing the pylon 4, has a traversing channel 25 that is intended to receive the rod 22 and has a truncated inlet 26.

The presence of the truncated inlet 26 allows any possible problems of aligning the connecting rod 23 of one half-part 8 in relation to the other one to be remedied.

It will be noted that the connecting rod 23 is mounted so as to be displaced freely in one direction at right angles relative to the pylon 4, said displacement being limited by means of a peripheral stop member 27, the maximum admissible displacement value being less than the maximum diameter of the truncated inlet 26.

The corresponding rod 22 is mounted on the movable cowl 8 inside a sleeve 29 intended to come substantially into alignment with the traversing channel 25 of the clevis 21 when the movable cowl 8 is in the closed position.

The said sleeve 29 includes a means for entraining the rod translationally, for example by means of a screw 30 and nut 31 system, associated with a power component 32 connected to an electric power supply 33. The sleeve 29 is also provided with a first position sensor 34 and a second position sensor 35 for the rod 22, said sensors connected electrically to means (not visible) for signaling the locked state or the unlocked state of the rod 22.

It will be noted that the sleeve 29 can include a flexible interface 36 applied between said sleeve and the movable cowl 8 with the aim of enabling better alignment of the rod 22 in the traversing channel 25 of the clevis 21, so as to reduce any excess stresses in the locking system 20 during operation.

In operation, the locking system 20 according to the invention also allows good locking to be provided in an efficient manner. In fact, if the rod 22 is removed from the sleeve 29 before the movable cowl 8 is closed, said rod 22 comes into contact with an external part of the connecting rod 23 or of the clevis 21 and the movable cowl 8 cannot be completely re-closed around the turbojet engine 2. Any possible obstruction in the traversing channel 25 of the clevis 21 will be detected thanks to the position sensors 34, 35 for the rod 22 since said rod will not be able to pass properly through the channel 25 of the clevis 21.

It is also expedient to note that the movable cowl 8 of the reverser structure generally includes sealing at its interface with the pylon 4. The said sealing is provided by seals that are advantageously in re-inforced silicone. They provide stress-free resistance to contact between the movable cowl 8 and the pylon 4. The possible displacement of the connecting rod 23 as well as the truncated inlet 26 of the clevis 21 must take the crushing value of said seal into consideration.

The means for entraining the rod 22 can also include associated electronic protection against blockages, and include control electronics that allow the locking conditions to be managed before actuation of the rod 22.

The method of entrainment and of signaling of such a locking system does not require a large amount of electric power. Consequently, the power used from the aircraft can be low, which reduces the risk of electric shocks during maintenance operations.

In operation, it is expedient to apply a locking sequence preferably starting with the locking systems 20 of the present invention before other locking means, notably along the bottom edge 14 of the movable cowl 8. The order in which the locking systems 20 according to the invention are locked is not important.

The sleeve 29 that accommodates the rod 22 is situated in an area of the movable cowl 8 that is difficult to access. This means that it is difficult for it to be subjected to visual checks and therefore must not need adjustments. Moreover, for improved locking reliability, it will be expedient to provide a clearance between the rod 22 and the clevis 21 no greater than that that allows the rod 22 to slide freely in the clevis 21, the so-called "operating clearance".

The locking systems 20 according to the invention allow stress-free locking and can also be used to provide locking along the bottom edge 14 of the movable cowls 8. In such a case, one of the movable cowls 8 is provided with the clevis 21 whilst the other is provided with the movable rod 22 forming the slider.

It will also be noted that other types of power sources can be used, notably mechanical ones with entrainment by cable. In such a case, the actuating area of the cable will preferably be positioned in the bottom part of the nacelle.

Figure 6:
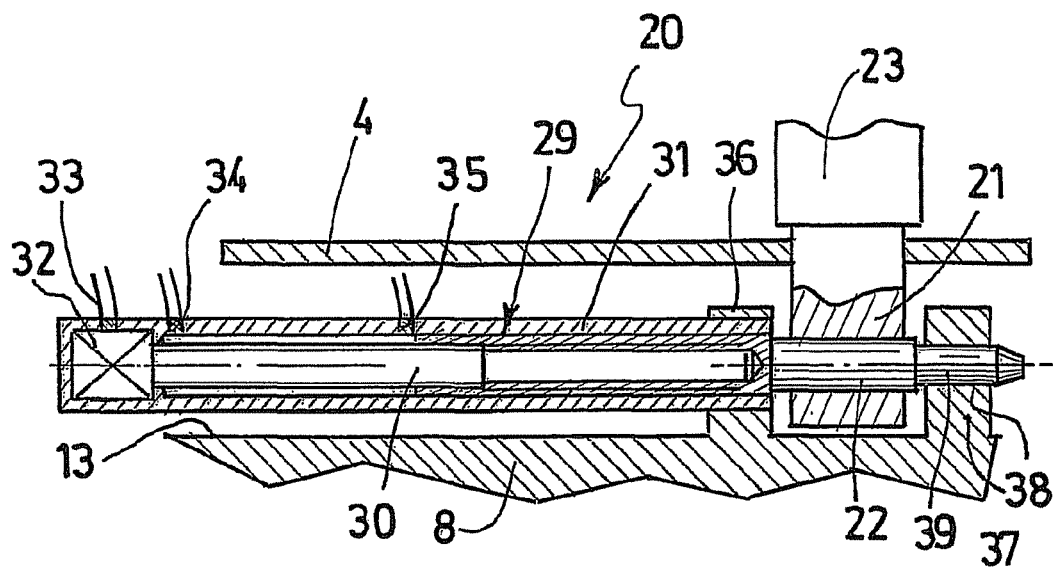
FIG. 6 is a longitudinal section of a schematic representation of a second embodiment of a locking system according to the invention, in its locked position.
Figure 7:
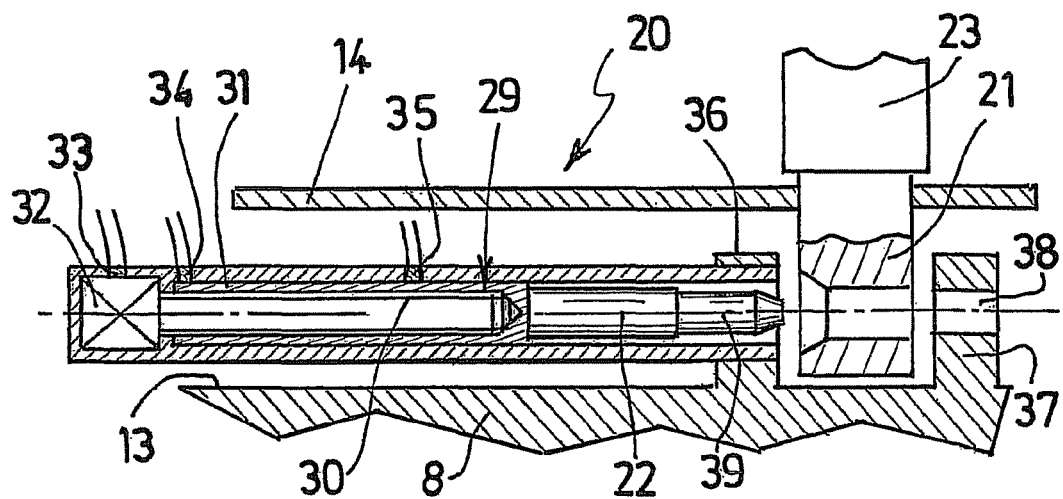
FIG. 7 is a representation of the locking system in FIG. 6 in its unlocked position.

FIGS. 6 and 7 generally show a second embodiment of the locking system 20 according to the invention.

In these Figures, the locking system 20 has an eyelet 37, which is integrated in or connected to the structure of the reverser and has a traversing passage 38 oriented so as to be aligned with the rod 22 and the traversing channel 25 of the clevis 21. Thus, an end 39 of the rod 22 engages in the eyelet 37 after having traversed the clevis 21 and, in this way, provides a better structural hold. In other words, the presence of said eyelet 37 no longer allows the rod 22 to buckle when operating but to shear under the effect of the stresses exerted on said rod 22 through the intermediary of the clevis 21.

The end of the rod 22 that is intended to pass through the passage of the eyelet 37 can have a diameter that is less than the diameter of the body of the rod 22.

Advantageously, a flexible interface can be applied between the end 39 of the rod 22 and the passage 38 so as to improve the alignment of said rod 22 and help its operation. It may even, in association with the flexible interface 36 of the sleeve 29, dampen certain vibratory forces and reduce contact forces at the interface between rod 22 and clevis 21.

Figure 8:
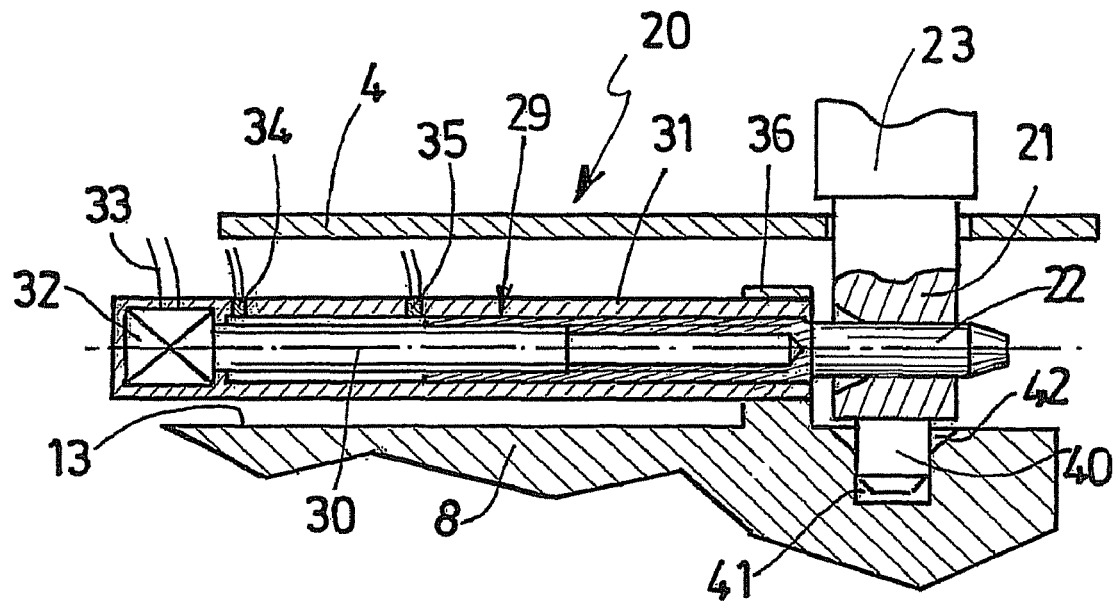
FIG. 8 is a representation of a third embodiment of a locking system according to the invention.

FIG. 8 generally shows a third embodiment of a locking system according to the invention, including a centering pin 40 that is fixed on the clevis 21 and is capable of cooperating with a corresponding bore 41 admitted in the structure of the movable cowl 8. Advantageously, with the aim of centering, the bore 41 has a truncated inlet 42. In such a case, the connecting rod 23, in an advantageous manner, will have a clearance in a longitudinal direction of the pylon 4.

Although the invention has been described with specific embodiments, it is obviously clear that it is in no way limited to the same and that it includes all technical equivalents of the means described as well as their combinations if such are part of the framework of the invention.

The invention claimed is:

1. An assembly comprising a nacelle of a turbojet engine connected to a pylon of an aircraft, said nacelle comprising at least one lateral movable cowl having at least one locking system, the movable cowl pivotable about an axis substantially perpendicular to a longitudinal axis of the nacelle, said locking system comprising, a clevis connected to the pylon, and a rod mounted on the movable cowl and able to engage with the clevis when the movable cowl is in the closed position, wherein the rod is mounted translationally mobile relative to said movable cowl along a substantially longitudinal axis of the movable cowl so as to form a slider that can move between a locked position in which the rod is engaged with the clevis and provides a structural connection between the pylon and the movable cowl, and an unlocked position in which the rod is disengaged from the clevis and allows the movable cowl to open.

2. The assembly according to claim 1, wherein the clevis of the locking system has a tapered opening.

3. The assembly according to claim 1, wherein the locking system includes a driving means of the rod.

4. The assembly according to claim 3, wherein the locking system includes a mechanical means for remote control of the rod.

5. The assembly according to claim 3, wherein the driving means of the connecting rod of the locking system includes at least one power component.

6. The assembly according to claim 5, wherein the locking system includes an electric means for remote control of the rod.

7. The assembly according to claim 1, wherein the locking system includes at least one position sensor of the rod configured to be connected to at least one associated signaling means.

8. The assembly according to claim 1, wherein the locking system includes an eyelet secured to the movable cowl and able to receive an end of the rod when the latter is in the locked position and has passed through the clevis.

9. The assembly according to claim 1, wherein the clevis is associated with a centering pin able to cooperate with a corresponding bore in the movable cowl, preferably having a tapered inlet.

10. The assembly according to claim 1, wherein the movable cowl of the nacelle belongs to a thrust reverser structure.

11. A propulsion assembly, further including an assembly according to claim 1 housing a turbojet engine.

12. The assembly according to claim 1, wherein the clevis is connected to the pylon via a floating connection configured to allow a displacement of functional play in at least one direction.

13. The assembly according to claim 12, wherein the maximum allowed functional play in a direction transverse to the direction of movement of the floating connection is smaller than the inlet diameter of the clevis.

* * * * *